J. B. TABLER.
AUTOMATIC LOCOMOTIVE HEAD LAMP.
APPLICATION FILED MAY 16, 1916.
1,214,387.
Patented Jan. 30, 1917.
3 SHEETS—SHEET 1.
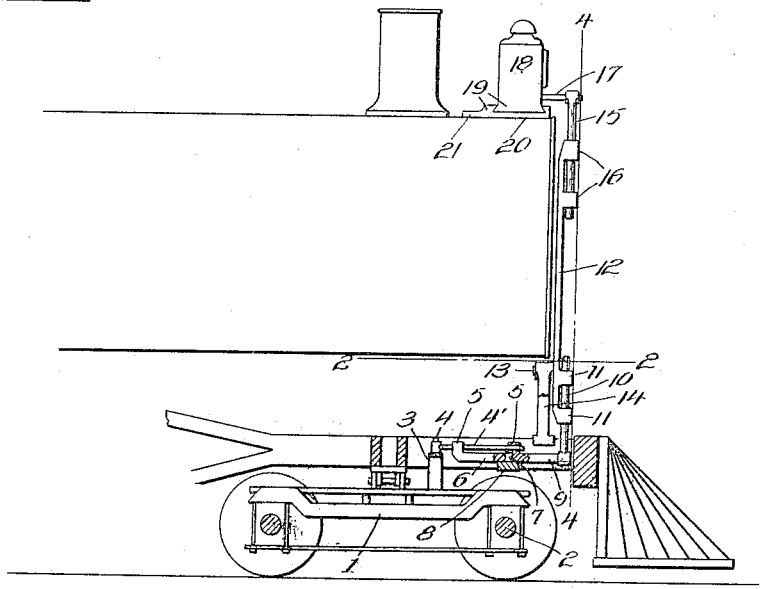
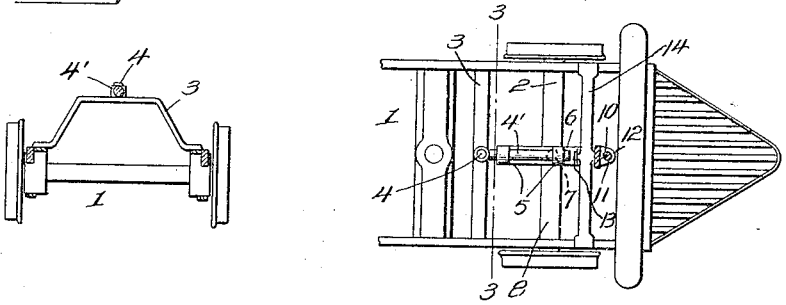
Witnesses
F. C. Gibson.
R. M. Smith.
Inventor
J. B. Tabler.
By Victor J. Evans
Attorney

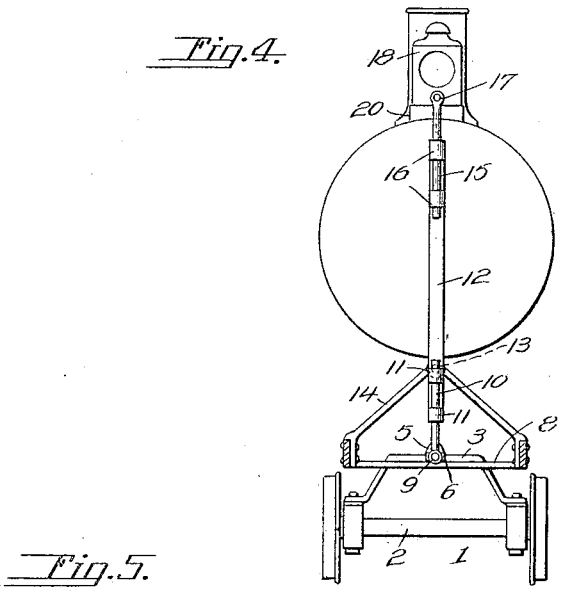
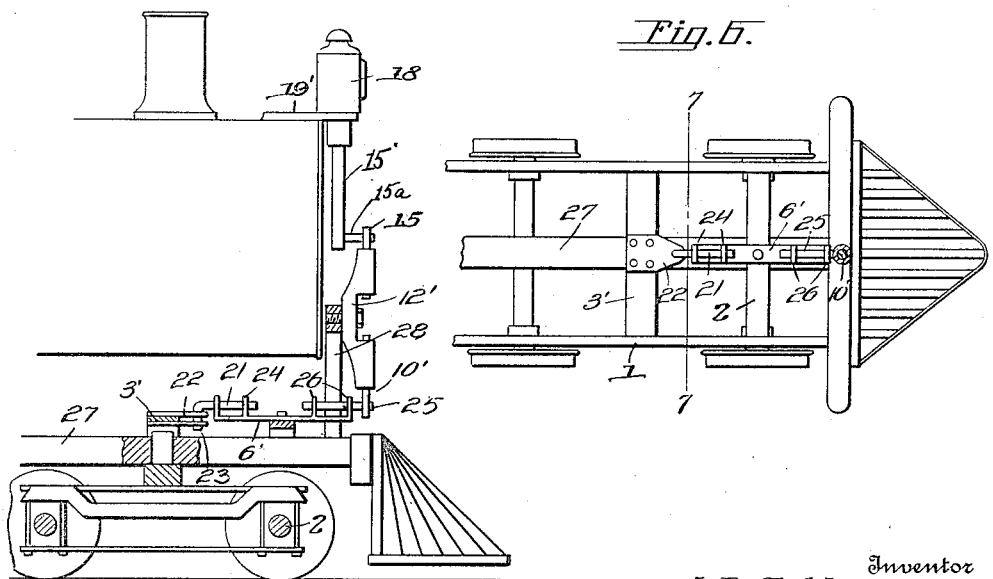

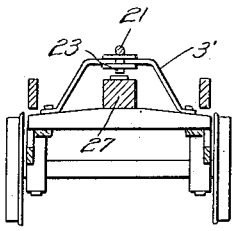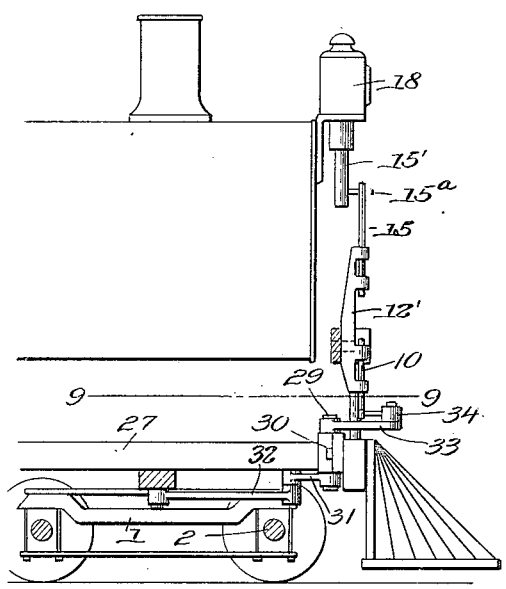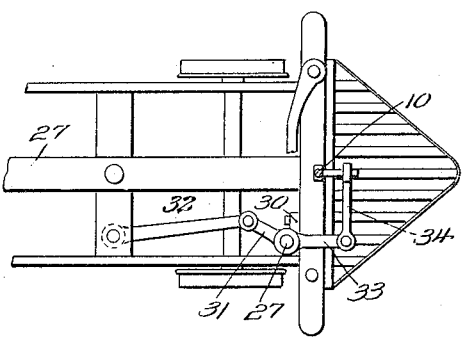

UNITED STATES PATENT OFFICE.

JACOB BOWMAN TABLER, OF STAR TANNERY, VIRGINIA.

AUTOMATIC LOCOMOTIVE HEAD-LAMP.

1,214,387.  Specification of Letters Patent.  Patented Jan. 30, 1917.

Application filed May 16, 1916. Serial No. 97,888.

*To all whom it may concern:*

Be it known that I, JACOB B. TABLER, a citizen of the United States, residing at Star Tannery, in the county of Frederick and State of Virginia, have invented new and useful Improvements in Automatic Locomotive Head-Lamps, of which the following is a specification.

This invention relates to headlamps for locomotives, including lamp turning mechanism so constructed and arranged relatively to the forward truck of the locomotive that the headlamp will be turned to any angle corresponding with that of the front truck of the locomotive so as to illuminate the track in advance of a turn and thereby avoid many serious accidents which have occurred owing to the fact that the headlamp of a locomotive was stationary and directs the rays of light straight ahead even when rounding a curve.

One of the chief aims of the present invention is to produce lamp turning mechanism of such a character as to work freely and with perfect reliability, without interfering with any of the fittings or parts of a locomotive, the lamp being arranged in its usual position in advance of the locomotive boiler.

With the above and other objects in view, the invention consists in the novel construction, combination and arrangement of parts, as herein described, illustrated and claimed.

In the accompanying drawings:—Figure 1 is a vertical longitudinal section through a sufficient portion of a locomotive and the front truck thereof to illustrate the applied relation of the lamp turning mechanism thereto. Fig. 2 is a horizontal section taken under the boiler and above the transmission lever. Fig. 3 is a vertical cross section on the line 3—3 of Fig. 2, showing the arch for connecting the transmission lever to the truck frame. Fig. 4 is a section on the line 4—4 of Fig. 1 taken in advance of the lamp turning lever. Fig. 5 is a vertical longitudinal section similar to Fig. 1 showing a modified form of some of the lamp turning connections. Fig. 6 is a horizontal section taken just above the transmission lever. Fig. 7 is a vertical transverse section on the line 7—7 of Fig. 6 taken adjacent to the arch-shaped primary actuating member of the lamp turning mechanism. Fig. 8 is a vertical longitudinal section similar to Fig. 1 showing other modified connecting means between the truck and lamp. Fig. 9 is a horizontal section on the line 9—9 of Fig. 8.

Referring to the drawings 1 designates the front truck of a locomotive and 2 the axle thereof which carries the forward wheels which of course are the first to be affected by a curve in the track thereby causing said axle to swing at an angle together with the forward truck.

Fixedly connected to the truck 1 is an arched primary lamp turning member 3 having an upstanding pivot 4 on which is journaled the rear end of a slide rod 4' movable through guides 5 on a transmission lever 6 which is connected by a pivot 7 between the ends thereof to a support 8 shown in the form of a cross bar connecting the side frame bars of the locomotive frame. The lever 6 is provided at its forward end with a stem 9 which is slidable in an opening in the lower end of a vertically disposed slide rod 10, the latter working through guides 11 on the lower arm of an upright lamp turning lever 12 which is connected by a pivot 13 to a stationary supporting arm 14 terminally fastened to the locomotive frame as shown. Associated with the upper arm of the lever 12 is another slide rod 15 which is movable through guides 16 on said upper arm of the lever. At its upper end the rod 15 is formed with an opening to slidably receive a lamp turning arm 17 which extends horizontally and in a forward direction from the headlamp shown at 18. The bottom of the lamp 18 is provided with a conical base flange 19 which is received in the socket 20 of a supporting bracket 21 fastened in any convenient way to the locomotive.

From the foregoing description, taken in connection with the accompanying drawings, it will now be understood that as the front truck turns on its pivotal connection with the locomotive frame, the pivot 4 describes an arc around said center and carries with it the slidable rod 4' which in turn swings the lever 6 in one direction or the other according as to whether the curve is a right or left one. The transmission lever 6 in turn moves the lower arm of the lamp turning lever to the right or to the left causing the upper arm of said lever to swing in the reverse direction and thereby turn the lamp 18 to an angle corresponding with the angles assumed by the wheels of the front truck of the locomotive.

In Figs. 5, 6 and 7 I have illustrated certain modifications which better adapt the device to locomotives of a different type, the mechanism shown in said figures, however, involving the same principle hereinabove set forth and accomplishing the same result. Under the arrangement shown in the last named figures, the arched-shaped primary actuating member 3′ has a forwardly extending lug 22 provided with an opening to receive the downturned end portion 23 of a slide rod 21 which is non-circular in cross section and which moves through openings of corresponding shape in guides 24 on the rear arm of the transmission lever 6.′ Another slide rod 25 works back and forth through guides 26 on the forward arm of said transmission lever and the forward end of said slide rod is connected with the lower extremity of the vertically disposed slide rod 10′ at the lower end of the lamp turning lever 12′.

Under the arrangement shown in Figs. 5, 6 and 8, the lamp 18 is mounted directly on the upper end of a lamp post 15′ which is journaled in a supporting bracket 19′, the post 15′ being provided with an arm 15ª which passes through an eye in the upper slidable member 15 of the lamp turning lever 12′. The mechanism shown in Figs. 5 to 7 inclusive is, however, better adapted to dodge the draw bar 27, the transmission lever being supported at the necessary elevation above the draw bar 27 by means of an arched support 28 to which said transmission lever is pivotally connected.

Figs. 8 and 9 illustrate the mechanism modified in such manner that a portion thereof is located below the draw bar 27 and another portion above but to one side of said draw bar. Under the arrangement shown in the last named figures, a vertical rock shaft 29 is mounted in fixed bearings 30 on the locomotive frame, said shaft having adjacent to its lower end an arm 31 which is connected by a pivotal link 32 either to the axle 2 of the truck or to the truck itself. The rock shaft 29 has on its upper end another arm 33 which is connected by a pivotal link 34 to the lower extremity of the vertically disposed slide rod 10. The remainder of the mechanism is similar to that described in connection with the preceding figures.

Under any and all of the arrangements hereinabove described and illustrated in the drawings, the headlamp of the locomotive is turned whenever the front truck turns in following curves in the road bed thus illuminating the curve in the track instead of throwing the rays of light straight ahead with relation to the longitudinal axis of the locomotive. Also by means of the slide rod arrangement used in connection with the lamp turning lever 12, provision is made for the up and down movement of the locomotive body in relation to the forward truck so as to prevent cramping and binding of any parts of the lamp turning mechanism.

I claim:—

1. The combination with the body of a locomotive, and a truck pivotally mounted thereunder and supporting the same, of a headlamp arranged to turn on a vertical axis, and lamp turning means actuated by said truck and comprising a horizontally disposed transmission lever actuated by the truck, and a lamp turning lever connecting said transmission lever with the lamp, said lamp turning lever embodying slidable members at both ends thereof, one of which is connected to the lamp turning lever and the other to the lamp.

2. The combination with the body of a locomotive, and a truck pivotally mounted thereunder and supporting the same, of a headlamp arranged to turn on a vertical axis, and lamp turning means actuated by said truck and comprising a horizontally disposed transmission lever actuated by the truck, a plurality of guides on said lever, a lamp turning lever connecting said transmission lever with the lamp, and an actuating rod for said transmission lever slidable in the guides of said lever and having a positive pivoted connection at one end with the truck.

In testimony whereof I affix my signature.

JACOB BOWMAN TABLER.

Witnesses:
  H. HIMELRIGHT,
  W. T. ORNDORFF.

Copies of this patent may be obtained for five cents each, by addressing the "Commissioner of Patents, Washington, D C."